United States Patent
Morisaka et al.

(10) Patent No.: US 8,158,195 B2
(45) Date of Patent: Apr. 17, 2012

(54) CATALYTIC CONVERTER AND MANUFACTURING METHOD THEREOF

(75) Inventors: Hideaki Morisaka, Yokohama (JP);
Masahiro Takaya, Yokosuka (JP);
Toshiharu Miyamura, Yokohama (JP);
Takeshi Yamauchi, Yokosuka (JP);
Yasunari Hanaki, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1071 days.

(21) Appl. No.: 12/021,795

(22) Filed: Jan. 29, 2008

(65) Prior Publication Data

US 2008/0317646 A1  Dec. 25, 2008

(30) Foreign Application Priority Data

Feb. 9, 2007 (JP) ................................. 2007-029886
Oct. 10, 2007 (JP) ................................. 2007-264054

(51) Int. Cl.
*B05D 3/02* (2006.01)
(52) U.S. Cl. ...................... 427/243; 427/244; 427/372.2
(58) Field of Classification Search ........................ None
See application file for complete search history.

(56) References Cited

U.S. PATENT DOCUMENTS

| | | | |
|---|---|---|---|
| 4,749,671 A | 6/1988 | Saito et al. | |
| 5,846,276 A | 12/1998 | Nagai et al. | |
| 6,641,785 B1 * | 11/2003 | Neufert et al. | 422/177 |
| 7,179,430 B1 * | 2/2007 | Stobbe et al. | 422/180 |
| 2005/0232829 A1 * | 10/2005 | Fuls | 422/180 |
| 2006/0140843 A1 | 6/2006 | Sung et al. | |

FOREIGN PATENT DOCUMENTS

| | | | |
|---|---|---|---|
| DE | 19626375 | * | 1/1997 |
| EP | 0 736 503 A1 | | 10/1996 |
| EP | 1 475 151 A1 | | 11/2004 |
| EP | 1 598 102 A1 | | 11/2005 |
| EP | 1 632 288 A1 | | 3/2006 |
| EP | 1 728 618 A1 | | 12/2006 |
| GB | 1074017 A | | 6/1967 |
| JP | 2001-187344 A | | 7/2001 |
| JP | 2002-102621 A | | 4/2002 |
| KR | 10-2004-0086981 A | | 10/2004 |

OTHER PUBLICATIONS

Abstracts and partial machine translation of JP2001-187344, Jul. 2001.*

* cited by examiner

*Primary Examiner* — Erma Cameron
(74) *Attorney, Agent, or Firm* — Foley & Lardner LLP

(57) ABSTRACT

A catalytic converter includes: a three-dimensional structural support having a plurality of cells partitioned by porous cell walls, in which a pore diameter of the cell walls is 10 μm to 50 μm and porosity of the cell walls is 40 vol % or more; and a catalyst-coated layer containing a catalyst component. The catalyst-coated layer is coated on surfaces of the cell walls of the three-dimensional structural support. 50 mass % or more of a total supported amount of the catalyst component on the three-dimensional structural support is present in a region from the surfaces of the cell walls of the three-dimensional structural support to surfaces of the catalyst-coated layer.

3 Claims, 7 Drawing Sheets

EXHAUST GAS

CATALYTIC CONVERTER AND MANUFACTURING METHOD THEREOF

BACKGROUND OF THE INVENTION

1. Field of the Invention

The present invention relates to a catalytic converter and a manufacturing method thereof. More specifically, the present invention relates to a catalytic converter capable of effectively utilizing a catalyst component supported thereon, and to a manufacturing method of the catalytic converter.

2. Description of the Related Art

Heretofore, in a gasoline engine, technologies for exhaust gas purification have been advanced following strict regulation for exhaust gas, and harmful substances contained in the exhaust gas have been surely being reduced. However, since a diesel engine has particularity to emit harmful components in a form of particulates, legal regulation for the harmful components and technical development for purification thereof have been delayed in comparison with those of the gasoline engine.

However, with regard to the particulates emitted from an internal combustion engine of an automobile, and particularly, from the diesel engine, a particle diameter of most thereof is 1 μm or less, and the particulates are likely to float in the atmosphere and to be taken into human bodies by breathing. In addition, it has been made obvious that carcinogens such as benzopyrene are contained in the particulates, and an adverse effect on the human bodies has become a large problem. Therefore, emission regulation for the particulates emitted from the diesel engine has been strengthened. Moreover, following such strengthening of the regulation, an exhaust gas purifying material capable of efficiently removing the particulates has been desired.

In recent years, as one of methods of removing the particulates, there has been known a method of using heat-resistant exhaust gas purifying filters such as a sealed ceramic honeycomb, ceramic foam, and metal foam, which are formed of three-dimensional structural supports. In this method, first, the particulates in the exhaust gas are collected. Then, after a back pressure rises, the exhaust gas purifying filters are heated by a burner, an electric heater, or the like, and the accumulated particulates are burned to be converted into carbon dioxide gas. Then, the carbon dioxide gas is emitted to the outside, and the filters are regenerated. These filters are filters of a surface collection type, which collect the particulates only on surfaces thereof. However, such a method has had a problem that a burning temperature of the particulates is high, resulting in that a large amount of energy is required to burn and remove the collected particulates and to regenerate the filters. Moreover, the method has had a problem that the filters are fused down and broken owing to combustion of the particulates in a high-temperature range and to reaction heat of the combustion. Moreover, since a special apparatus becomes necessary, the method has had a problem that a size and cost of the filters as purifying apparatuses are increased.

Meanwhile, there is a method, in which a catalyst is supported on the filter, the particulates are burned by a catalytic reaction, and the filter is burned and regenerated by heat of the exhaust gas without using the heater or the like. For Example, there have been proposed a particulate removing catalyst, in which a catalyst layer is coated on the filter, and the particulates are treated by a catalytic function, and proposed a manufacturing method of the particulate removing catalyst (refer to Japanese Patent Unexamined Publication No. 2002-102621).

BRIEF SUMMARY OF THE INVENTION

However, since the trapped particulates are accumulated on a surface of the filter, the particulate removing catalyst described in Japanese Patent Unexamined Publication No. 2002-102621 has had a problem that the catalytic function cannot be fully exerted unless contact interfaces between the catalyst layer and the particulates are increased. Note that Japanese Patent Unexamined Publication No. 2002-102621 does not have any description or suggestion regarding the contact interfaces between the particulates and the catalyst layer.

The present invention has been made in consideration for such problems inherent in the conventional technology. It is an object of the present invention to provide a catalytic converter that enhances catalyst activity thereof by increasing the contact interfaces between the particulates and the catalyst layer, and to provide a manufacturing method of the catalytic converter.

The first aspect of the present invention provides a catalytic converter comprising: a three-dimensional structural support having a plurality of cells partitioned by porous cell walls, in which a pore diameter of the cell walls is 10 μm to 50 μm and porosity of the cell walls is 40 vol % or more; and a catalyst-coated layer containing a catalyst component, the catalyst-coated layer being coated on first surfaces of the cell walls of the three-dimensional structural support, wherein 50 mass % or more of a total supported amount of the catalyst component on the three-dimensional structural support is present in a region from the first surfaces of the cell walls of the three-dimensional structural support to second surfaces of the catalyst-coated layer.

The second aspect of the present invention provides a manufacturing method of the catalytic converter, the method comprising: dispersing, in a solvent, the catalyst component and a disappearing material disappearing by heat, thereby obtaining a slurry; coating the obtained slurry on the three-dimensional structural support; and baking the slurry-coated three-dimensional structural support to eliminate the disappearing material.

The third aspect of the present invention provides a manufacturing method of the catalytic converter, the method comprising: dispersing, in a first solvent, a disappearing material disappearing by heat, thereby obtaining a disappearing material slurry; coating the disappearing material slurry on the three-dimensional structural support, followed by drying, thereby forming a disappearing material-coated layer; further coating a catalyst slurry, in which the catalyst component is dispersed in a second solvent, on the three-dimensional structural support on which the disappearing material-coated layer is formed; and baking the catalyst slurry-coated three-dimensional structural support to eliminate the disappearing material.

DETAILED DESCRIPTION OF THE INVENTION

A description will be made in detail of a catalytic converter of the present invention and a manufacturing method thereof by using the drawings. Note that, in this specification, a symbol "%" added to a concentration, content, a loading weight and the like denotes a mass percent unless otherwise specified.

The catalytic converter of the present invention is composed by coating a catalyst-coated layer, which contains a catalyst component, on a three-dimensional structural support having a plurality of cells partitioned by cell walls. In the catalytic converter, the catalyst component is locally present in vicinities of surfaces of the three-dimensional structural support.

Figure 1:
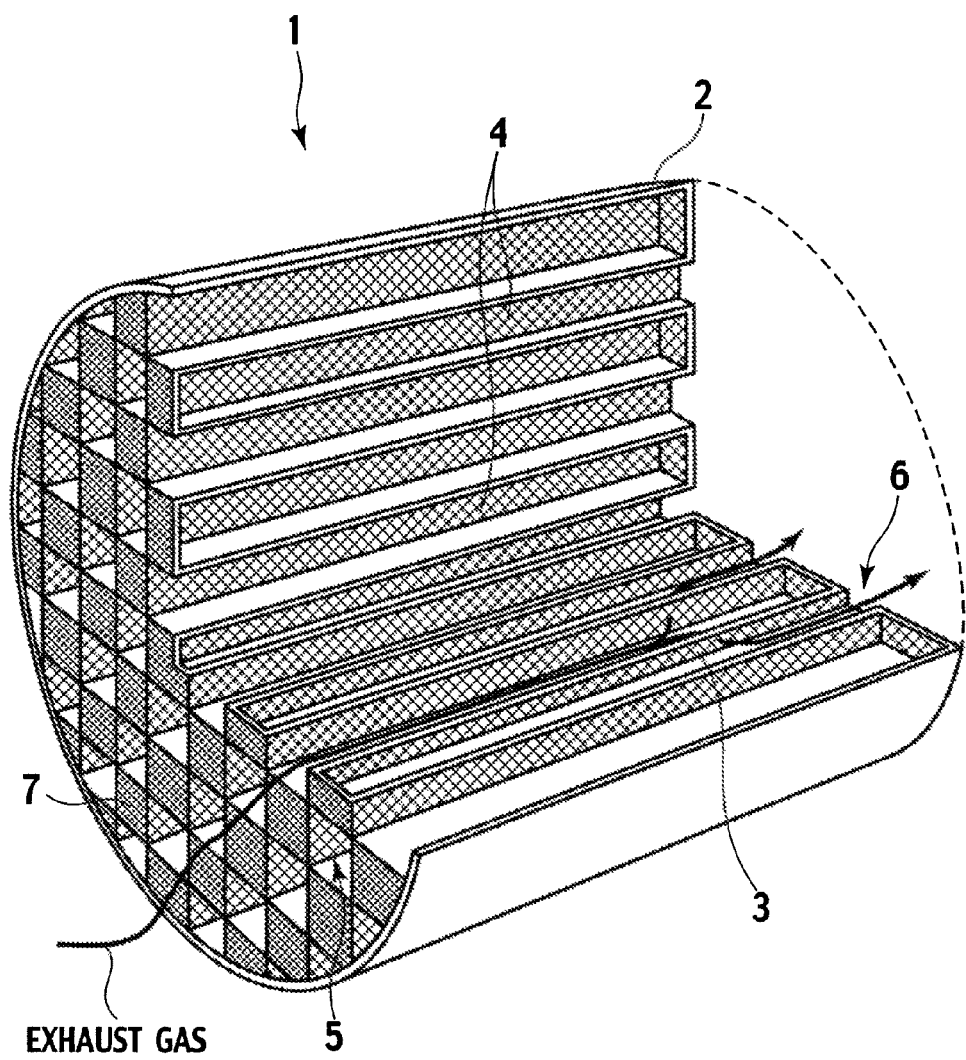
FIG. 1 is a perspective view showing an embodiment of a catalytic converter of the present invention.

FIG. 1 shows an embodiment of the catalytic converter of the present invention. Note that, in FIG. 1, a catalytic converter cut away on dotted lines is shown for convenience of explanation. As shown in FIG. 1, a catalytic converter 1 is columnar, and uses a three-dimensional structural support 2 having a plurality of cells 4 partitioned by cell walls 3. The three-dimensional structural support 2 uses, as filter elements, the cell walls 3 including a plurality of pores with a diameter sufficient for removing particulates from exhaust gas. In the three-dimensional structural support 2, the plurality of cells 4 are formed in parallel to one another by the cell walls 3. Moreover, with regard to cell inlets 5 and cell outlets 6 of the cells 4, which are individually adjacent to one another, some thereof are closed by sealing members 7 while alternately interposing the other opened ones thereamong and in a zigzag manner. As shown by arrows in FIG. 1, the exhaust gas flows into the three-dimensional structural support 2 from each cell opened at the cell inlet 5 of the three-dimensional structural support 2, flows into the cells 4 adjacent to the above-described opened cell through the plurality of pores of the cell walls 3, and is emitted through the cell outlets 6 at an opened end.

Figure 2:
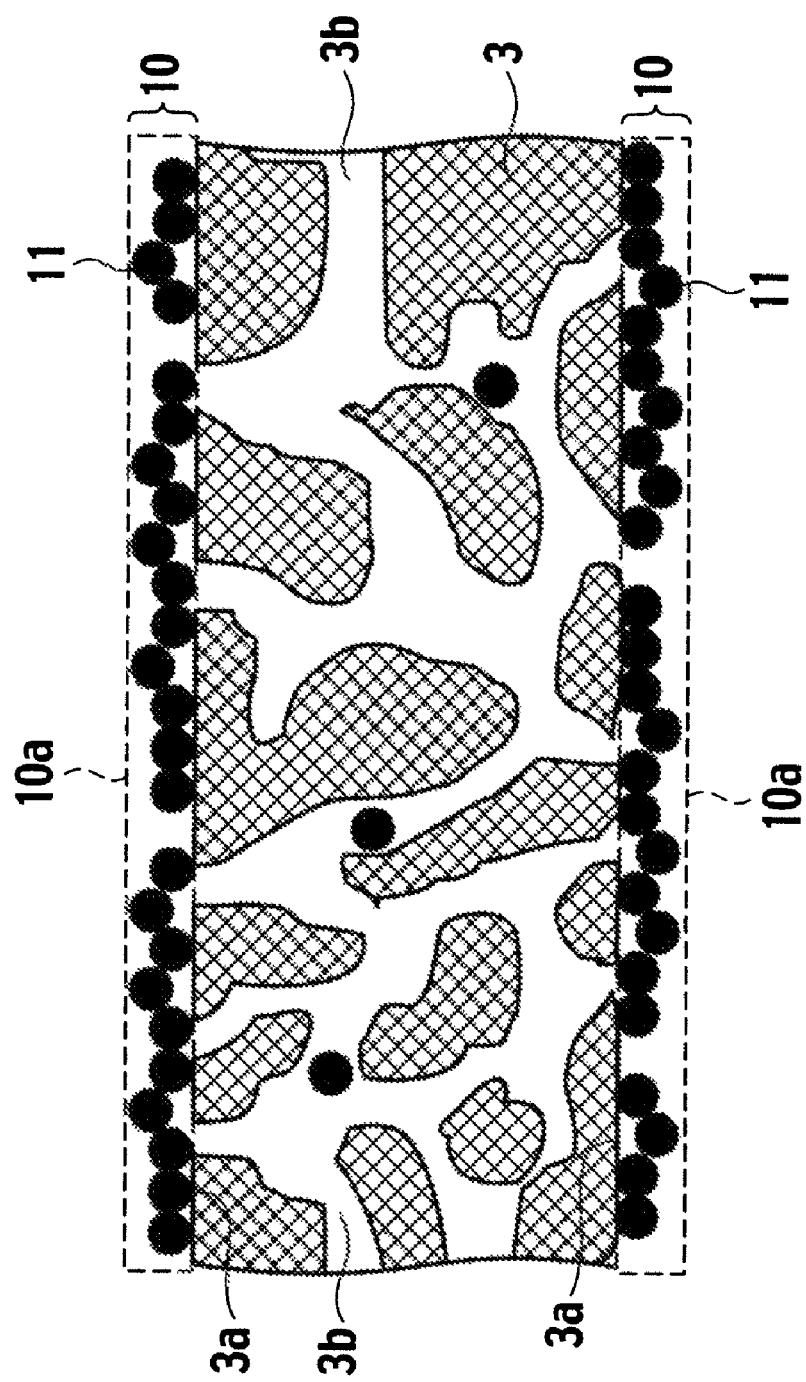
FIG. 2 is a schematic cross-sectional view showing a vicinity of a cell wall in the catalytic converter.

Moreover, as shown in FIG. 2, the catalytic converter 1 of the present invention is composed by coating a catalyst-coated layer 10, which contains a catalyst component 11, on the three-dimensional structural support 2. In the catalytic converter 1, the catalyst component 11 is locally present in vicinities of surfaces 3a (first surfaces 3a) of the three-dimensional structural support 2. Here, that the catalyst component 11 is locally present stands for that at least 50% of a total amount of the catalyst component 11, which is supported on the three-dimensional structural support 2, is present in a region from the surfaces 3a of each cell wall 3 of the three-dimensional structural support 2 to surfaces 10a (second surfaces 10a) of the catalyst-coated layer 10 on a cross section of the catalytic converter 1. Specifically, in the catalytic converter 1 of the present invention, it is preferable that a ratio of the catalyst component 11 that has entered the pores 3b of each cell wall 3 of the three-dimensional structural support 2 be less than 50% of the total supported amount of the catalyst component 11 on the three-dimensional structural support 2.

Heretofore, in a catalytic converter in which the catalyst is supported on such a three-dimensional structural support, a relatively large amount of the catalyst component is supported in insides of pores of the three-dimensional structural support. However, since the catalytic converter 1 of the present invention has such a cross-sectional structure as described above in an inside thereof, the supported amount of the catalyst on the surfaces of each cell wall is large. Meanwhile, the particulates are accumulated on surfaces of such a heat-resistant filter, and hardly enter the insides of the pores. Therefore, in the catalytic converter of the present invention, contact interfaces between the particulates and the catalyst component 11 are increased. Hence, the catalyst component 11 can be utilized effectively, and catalyst activity of the catalytic converter can be enhanced.

Here, from a viewpoint of enhancing the catalyst activity more, it is preferable that 80% or more of the total supported amount of the catalyst component 11 on the three-dimensional structural support 2 be contained in the catalyst-coated layer 10. Specifically, it is preferable that the ratio of the catalyst component 11 that has entered the pores 3b of each cell wall 3 of the three-dimensional structural support 2 be less than 20% of the total supported amount of the catalyst component 11 on the three-dimensional structural support 2.

Figure 5:
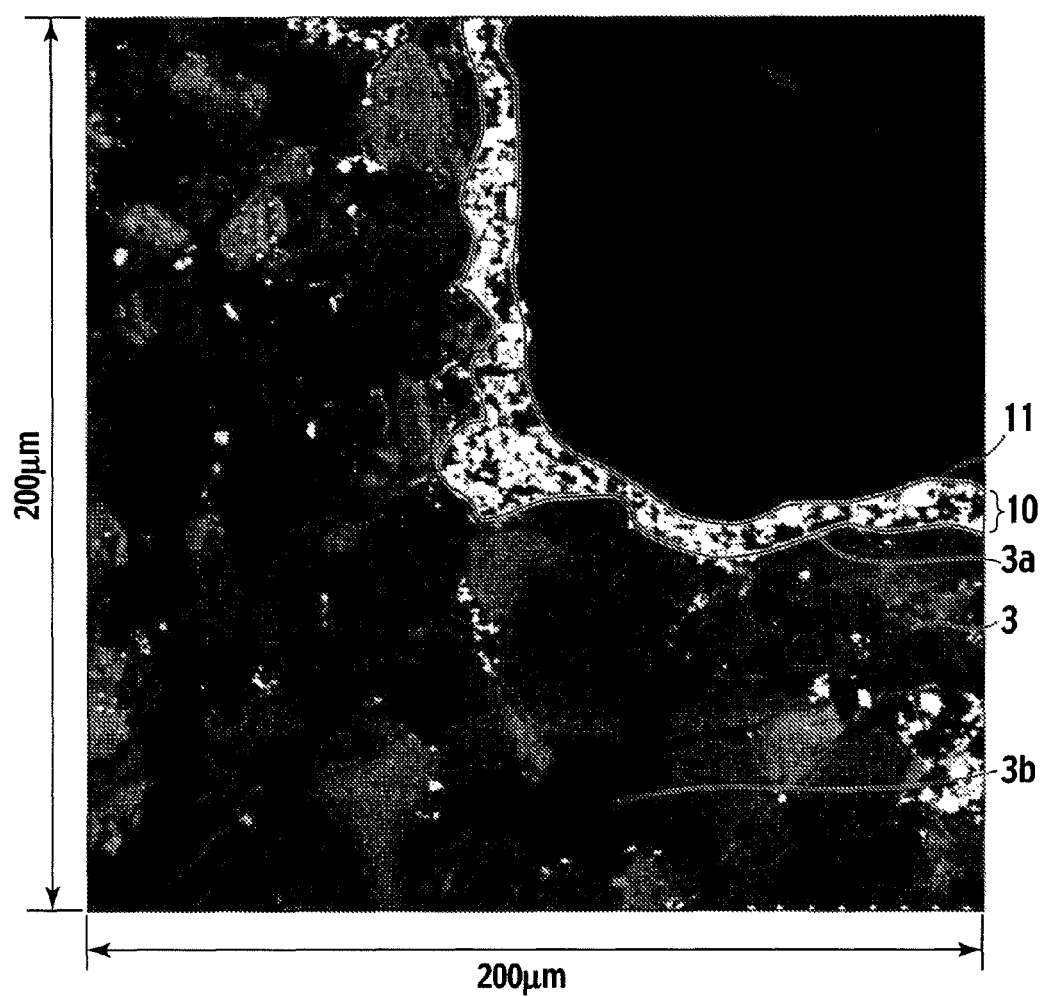
FIG. 5 is a picture of a partial cross section, showing a state where a catalyst component is supported in Example 1.
Figure 6:
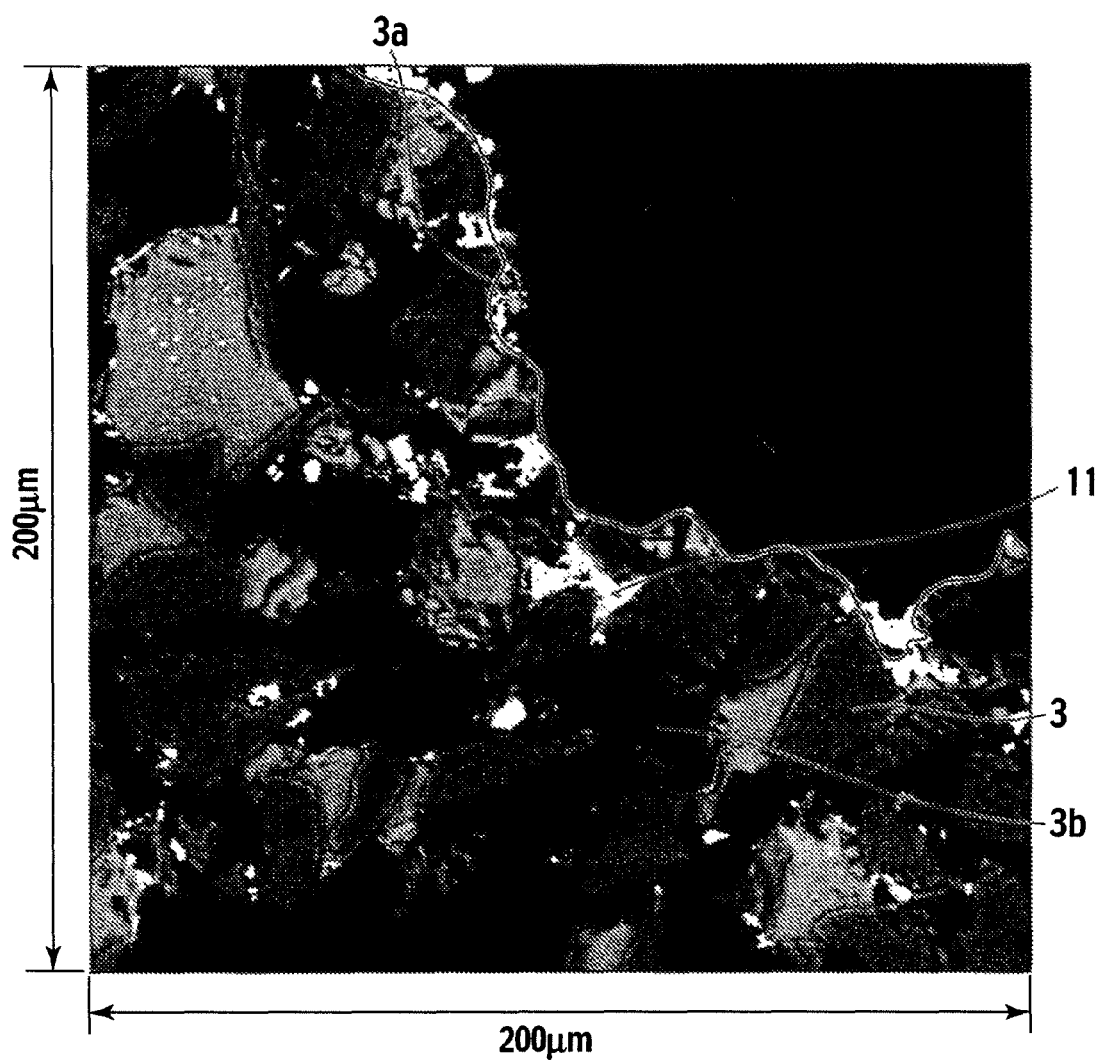
FIG. 6 is a picture of a partial cross section, showing a state where the catalyst component is supported in Comparative Example 1.
Figure 7:
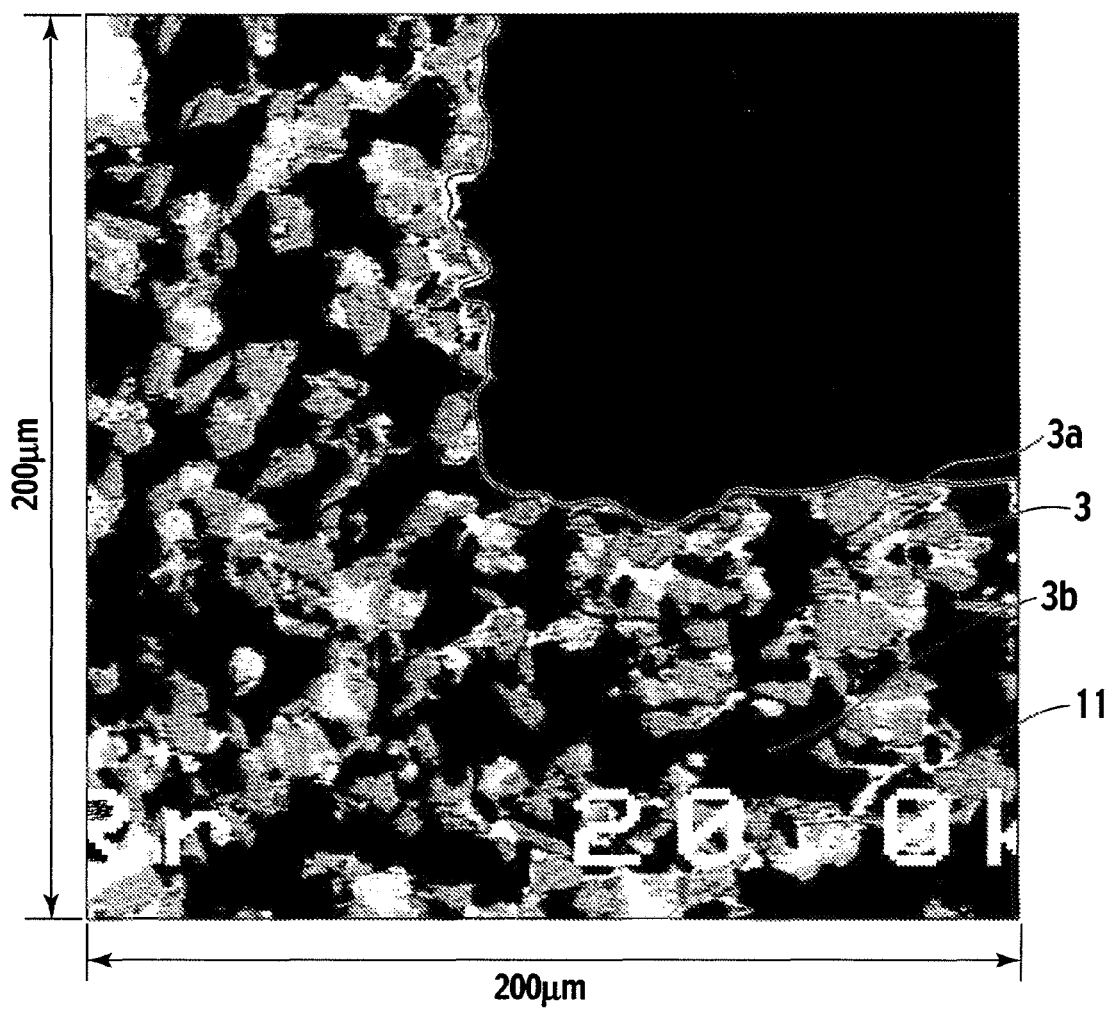
FIG. 7 is a picture of a partial cross section, showing a state where the catalyst component is supported in Comparative Example 4.

With regard to measurement of the coated amount (supported amount on the catalyst-coated layer) of the catalyst component, as shown in FIGS. 5 to 7, which percent in a total catalyst area the catalyst component occupies on the surface of each cell wall just needs to be measured on an SEM picture. Here, the SEM picture is taken from a region of 200×200 μm with a corner portion in the cell of the three-dimensional structural support being taken as a center.

It is preferable that the catalyst component contain a metal oxide from a viewpoint of burning the particulates by a catalytic function. Specifically, as the metal oxide, there can be used cerium oxide ($CeO_2$), praseodymium oxide ($Pr_6O_{11}$), yttrium oxide ($Y_2O_3$), bismuth oxide ($Bi_2O_3$), zirconium oxide ($ZrO_2$), or aluminum oxide ($Al_2O_3$), or an arbitrary combination thereof. Moreover, as the catalyst component, there can be suitably used platinum (Pt), palladium (Pd), rhodium (Rh), silver (Ag) or gold (Au), or a combination thereof. Typically, a catalyst component can be suitably used, in which Pt, Pd, Rh, Ag, Au or the like is supported on the above-described metal oxide.

Note that, though the catalyst-coated layer contains the catalyst component as described above, besides this, the catalyst-coated layer can contain iron oxide (FeO, $Fe_2O_3$, $Fe_3O_4$), manganese oxide (MnO, $Mn_2O_3$, $MnO_2$), or the like.

Meanwhile, as the above-mentioned three-dimensional structural support, a three-dimensional structural support can be used, which has a plurality of cells partitioned by cell walls, in which a pore diameter of the cell walls is 10 μm to 50 μm, and porosity of the cell walls is 40 vol % or more. Typically, a heat-resistant filter such as a ceramic-made honeycomb support, a ceramic foam filter and a metal foam filter can be used. When the pore diameter and porosity of the cell walls go out of the above-described ranges, even if the catalyst component is attempted to be adhered onto the surfaces of the porous support by using a slurry of a usual catalyst component, a relatively large amount of the catalyst component enters the pores in the inside of the support, and it becomes difficult to effectively exert the catalyst activity. Note that, preferably, an upper limit of the porosity of the cell walls is set at 70 vol % or less from a viewpoint of maintaining strength of the three-dimensional structural support itself.

As the above-described honeycomb support, a heat-resistant filter of a wall flow type can be used particularly preferably. The heat-resistant filter of the wall flow type is a honeycomb support having the following configuration. Specifically, as shown in FIG. 1, the cells in which one ends are sealed and are opened are alternately adjacent on one end surface of the support, and the sealed ends are arranged inversely between the one end surface of the support and the other end surface thereof. Note that, with regard to a material of the three-dimensional support, cordierite, silicon carbide and the like can be mentioned as the ceramics, and ferrite-series stainless steel and the like can be mentioned as the foamed metal.

Note that, in this specification, the porosity indicates a volume ratio of all the pores with respect to a total volume of the cell walls as porous bodies, and can be obtained by the Archimedean method. Moreover, the pore diameter of the pores in the cell walls can be obtained by the mercury porosimetry.

Next, a description will be made in detail of the manufacturing method of the catalytic converter according to the present invention.

In a first manufacturing method according to the present invention, the following steps are performed in the event of manufacturing the above-described catalytic converter, which are: the step of dispersing, in a solvent, powder of the catalyst component and a disappearing material disappearing by heat, thereby obtaining a slurry; the step of coating the obtained slurry on the above-described three-dimensional structural support; and the baking step for eliminating the disappearing material after coating the slurry.

Figure 3:
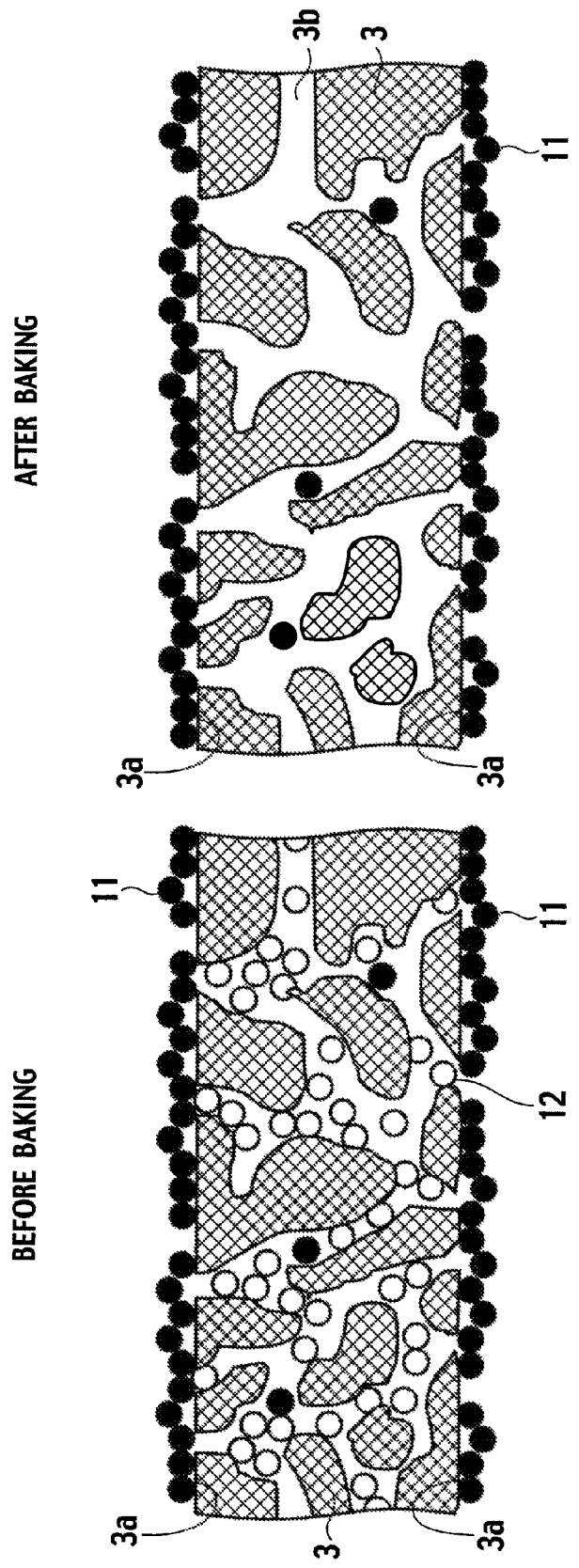
FIG. 3 is schematic cross-sectional views showing an Example of a manufacturing process of the catalytic converter.
Figure 4:
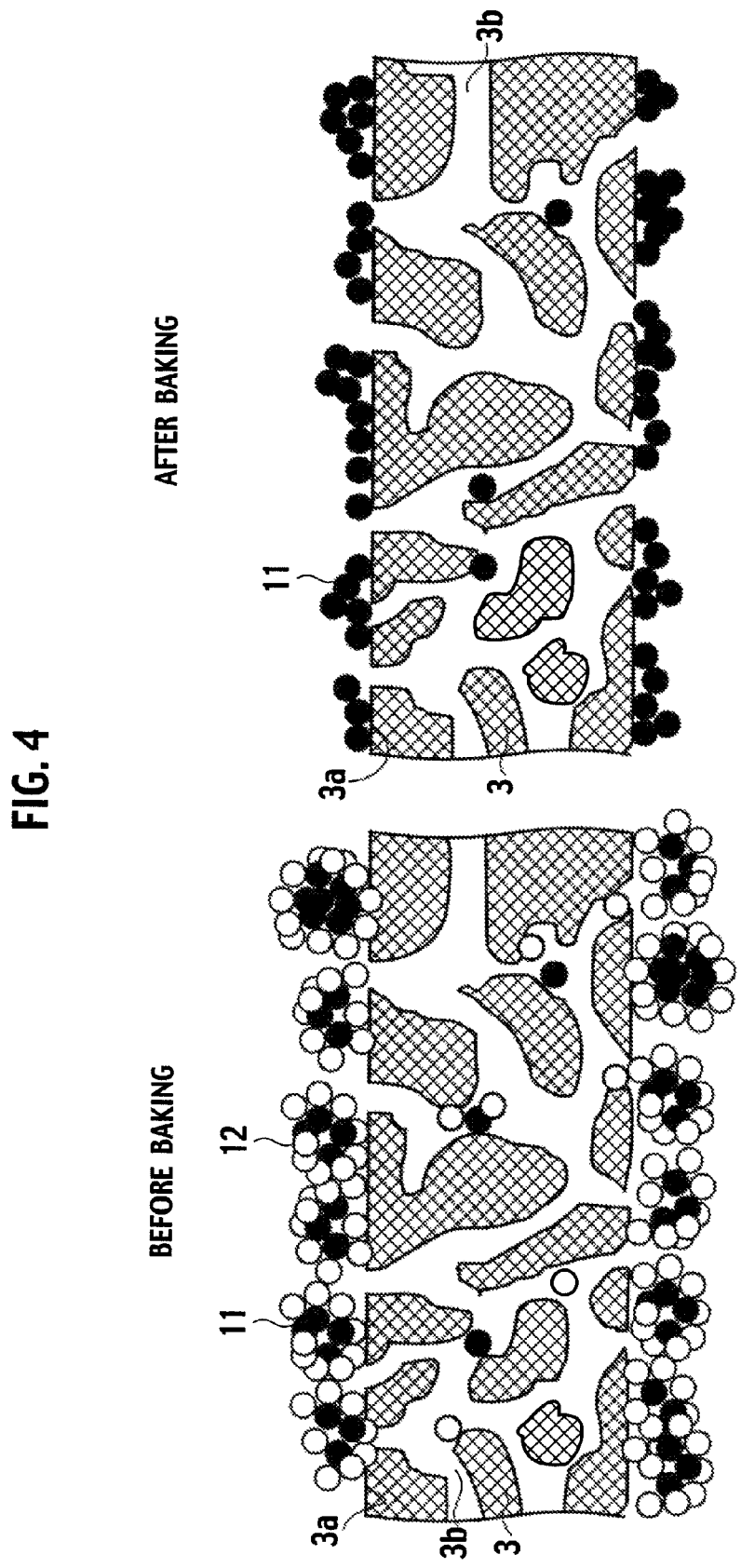
FIG. 4 is schematic cross-sectional views showing another Example of the manufacturing process of the catalytic converter.

The catalytic converter is manufactured in such a manner, whereby the catalyst component can be made to positively gather on the surfaces of each cell wall of the support, and can be made locally present thereon. Accordingly, the catalyst activity is enhanced. However, a mechanism that enables the catalyst component to be locally present by using the disappearing material is not necessarily obvious. However, the mechanism is considered to be as follows, for Example, as shown in FIG. 3. First, the pores 3b in the cell wall 3 of the support 2 are closed by carbon particles as the disappearing material 12. Thereafter, the catalyst component 11 is coated on the surfaces 3a of the cell wall 3, and the carbon particles disappear by the baking step. In such a way, only a very small amount of the catalyst component 11 enters the insides of the pores 3b in the support 2. Moreover, another mechanism is considered to be as follows as shown in FIG. 4. In the event of coating the slurry, which contains the disappearing material 12 and the catalyst component 11, on the cell wall 3 of the support 2, the catalyst component 11 is adhered onto circumferences of the carbon particles serving as the disappearing material 12 owing to attractive force caused by electric charge. Then, the carbon particles onto which the catalyst component 11 is adhered remains on the surfaces 3a of the cell wall 3 of the support 2, and do not enter the insides of the pores 3b in the support 2.

Moreover, a second manufacturing method according to the present invention is characterized in that the following steps are performed in the event of manufacturing the above-mentioned catalytic converter, which are: the step of dispersing, in a solvent, a disappearing material disappearing by heat, thereby obtaining a slurry of the disappearing material; the step of coating the slurry of the disappearing material on the above-described three-dimensional structural support, followed by drying, thereby forming a disappearing material-coated layer; the step of further coating a catalyst slurry, in which powder of the catalyst component is dispersed, on the three-dimensional structural support on which the disappearing material-coated layer is formed; and the baking step for eliminating the disappearing material after coating the catalyst slurry. Specifically, in the second manufacturing method, first, the disappearing material-coated layer is formed on the three-dimensional structural support, whereby the disappearing material is filled into the pores present in the cell wall of the support, and thereafter, the catalyst component is coated thereon, whereby the catalyst component is prevented from entering the insides of the pores.

In the first and second manufacturing methods according to the present invention, as the disappearing material, there can be used activated carbon, polymer resin beads, cellulose, or chaff, or an arbitrary combination thereof. In particular, as the polymer resin beads, it is suitable to use polystyrene beads or polypropylene beads. Use of such disappearing materials is effective since the use makes it easy to fix the catalyst component on the surfaces of the support, and allows the disappearing materials to disappear quickly.

A description will be made below more in detail of the present invention by using Examples and comparative Examples; however, the present invention is not limited to these Examples.

EXAMPLE 1

450 g of cerium oxide powder, 125 g of activated carbon, and 50 g of alumina sol were mixed into 2000 g of water, followed by stirring, whereby a catalyst slurry was prepared.

Next, a SiC-made honeycomb support was prepared, in which a diameter was 144 mm, a height was 152 mm, a cell density was 400/in$^2$, a center pore diameter in the cell wall was 10 to 20 μm, and porosity was 50 to 60 vol %. This honeycomb support was immersed into the above-described catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter.

FIG. 5 shows the SEM picture of a vicinity of the corner of the honeycomb in the catalytic converter of this Example. From FIG. 5, the following is understood. Specifically, a major part of the catalyst component 11 that looks white forms a shape (L shape) resembling a shape of the corner of the honeycomb, is locally present on the surface 3a of the cell wall 3 of the support, and forms the catalyst-coated layer 10. In addition, white points are hardly present in the insides of the pores 3b in the support, and the catalyst component 11 hardly enters the insides of the pores 3b in the support.

Note that 83% of the total supported amount of the catalyst component 11 was coated on the surface 3a of the support. Note that a supported ratio of the catalyst component was obtained by the following equation.

on-surface supported ratio(%)=(area of catalyst component in catalyst-coated layer/area of total catalyst component)×100

EXAMPLE 2

450 g of cerium/praseodymium composite oxide powder, 125 g of activated carbon, and 50 g of alumina sol were mixed into 2000 g of water, followed by stirring, whereby a catalyst slurry was prepared.

Next, the SiC-made honeycomb support used in Example 1 was prepared, and was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 82% of the total supported amount of the catalyst component was coated on the surface of the support.

EXAMPLE 3

450 g of cerium/yttrium composite oxide powder, 125 g of activated carbon, and 50 g of alumina sol were mixed into 2000 g of water, followed by stirring, whereby a catalyst slurry was prepared.

Next, the SiC-made honeycomb support used in Example 1 was prepared, and was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 82% of the total supported amount of the catalyst component was coated on the surface of the support.

EXAMPLE 4

488 ml of a dinitrodiamine platinum solution (platinum concentration: 8.02%) and 450 g of aluminum oxide powder were mixed into 1000 g of water, whereby platinum was impregnated and supported onto the aluminum oxide powder. A supported amount of the platinum was set at 8%.

Next, 450 g of platinum-supported aluminum oxide powder, 125 g of activated carbon, and 50 g of alumina sol were mixed into 2000 g of water, followed by stirring, whereby a catalyst slurry was prepared.

Thereafter, the SiC-made honeycomb support used in Example 1 was prepared, and was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 80% of the total supported amount of the catalyst component was coated on the surface of the support.

EXAMPLE 5

125 g of activated carbon was mixed into 1000 g of water, whereby an activated carbon suspension was prepared.

Next, the SiC-made honeycomb support used in Example 1 was prepared, and was immersed into the activated carbon suspension (disappearing material slurry), and an excessive suspension was removed therefrom, followed by drying at 150° C. for two hours. A formed amount of an activated carbon layer (disappearing material-coated layer) was 12.5 g per liter of the honeycomb support.

450 g of cerium oxide powder, and 50 g of alumina sol were mixed into 2000 g of water, followed by stirring, whereby a catalyst slurry was prepared.

Next, the honeycomb support on which the activated carbon layer was formed was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 85% of the total supported amount of the catalyst component was coated on the surface of the support.

EXAMPLE 6

A honeycomb support on which an activated carbon layer (disappearing material-coated layer) was formed was prepared in a same manner to Example 5.

450 g of cerium/praseodymium composite oxide powder, and 50 g of alumina sol were mixed into 2000 g of water, followed by stirring, whereby a catalyst slurry was prepared.

Next, the honeycomb support on which the activated carbon layer was formed was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 82% of the total supported amount of the catalyst component was coated on the surface of the support.

EXAMPLE 7

A honeycomb support on which an activated carbon layer (disappearing material-coated layer) was formed was prepared in a same manner to Example 5.

450 g of cerium/yttrium composite oxide powder, and 50 g of alumina sol were mixed into 2000 g of water, followed by stirring, whereby a catalyst slurry was prepared.

Next, the honeycomb support on which the activated carbon layer was formed was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 81% of the total supported amount of the catalyst component was coated on the surface of the support.

EXAMPLE 8

A honeycomb support on which an activated carbon layer (disappearing material-coated layer) was formed was prepared in a same manner to Example 5.

450 g of the platinum-supported aluminum oxide powder prepared in Example 4, and 50 g of alumina sol were mixed into 2000 g of water, followed by stirring, whereby a catalyst slurry was prepared.

Next, the honeycomb support on which the activated carbon layer was formed was immersed into the catalyst slurry, and excessive catalyst slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 80% of the total supported amount of the catalyst component was coated on the surface of the support.

EXAMPLE 9

Same operations to those of Example 1 were repeated except that the activated carbon of Example 1 was replaced by polystyrene beads, whereby a catalytic converter of this Example was obtained. A formed amount of the catalyst layer was 50 g per liter of the catalytic converter. 61% of the total supported amount of the catalyst component was coated on the surface of the support.

EXAMPLE 10

Same operations to those of Example 2 were repeated except that the activated carbon of Example 2 was replaced by polystyrene beads, whereby a catalytic converter of this Example was obtained. A formed amount of the catalyst layer was 50 g per liter of the catalytic converter. 59% of the total supported amount of the catalyst component was coated on the surface of the support.

EXAMPLE 11

Same operations to those of Example 3 were repeated except that the activated carbon of Example 3 was replaced by polystyrene beads, whereby a catalytic converter of this Example was obtained. A formed amount of the catalyst layer was 50 g per liter of the catalytic converter. 62% of the total supported amount of the catalyst component was coated on the surface of the support.

EXAMPLE 12

Same operations to those of Example 4 were repeated except that the activated carbon of Example 4 was replaced by polystyrene beads, whereby a catalytic converter of this Example was obtained. A formed amount of the catalyst layer was 50 g per liter of the catalytic converter. 62% of the total supported amount of the catalyst component was coated on the surface of the support.

COMPARATIVE EXAMPLE 1

450 g of cerium oxide powder and 50 g of alumina sol were mixed into 2000 g of water, followed by stirring, whereby a slurry was prepared.

Next, the SiC-made honeycomb support used in Example 1 was prepared, and was immersed into the slurry, and excessive slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter.

FIG. 6 shows an SEM picture of a vicinity of a corner of the honeycomb in the catalytic converter of this Example. It is understood that, unlike FIG. 5, the catalyst component 11 that looks white enters considerably the insides of the pores 3b in the support, and the amount of the catalyst component 11 locally present on the surface 3a of the cell wall 3 is small. Note that 35% of the total supported amount of the catalyst component was coated on the surface of the support.

COMPARATIVE EXAMPLE 2

450 g of cerium/praseodymium composite oxide powder and 50 g of alumina sol were mixed into 2000 g of water, followed by stirring, whereby a slurry was prepared.

Next, the SiC-made honeycomb support used in Example 1 was prepared, and was immersed into the slurry, and excessive slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 8% of the total supported amount of the catalyst component was coated on the surface of the support.

COMPARATIVE EXAMPLE 3

450 g of cerium/yttrium composite oxide powder and 50 g of alumina sol were mixed into 2000 g of water, followed by stirring, whereby a slurry was prepared.

Next, the SiC-made honeycomb support used in Example 1 was prepared, and was immersed into the slurry, and excessive slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter. 7% of the total supported amount of the catalyst component was coated on the surface of the support.

COMPARATIVE EXAMPLE 4

A dinitrodiamine platinum solution and 450 g of aluminum oxide powder were mixed into 1000 g of water, whereby platinum was impregnated and supported onto the aluminum oxide powder. A supported amount of the platinum was set at 8%.

Next, 450 g of platinum-supported aluminum oxide powder and 50 g of alumina sol were mixed into 2000 g of water, followed by stirring, whereby a catalyst slurry was prepared.

Next, the SiC-made honeycomb support used in Example 1 was prepared, and was immersed into the catalyst slurry, and excessive slurry was then removed therefrom, followed by drying at 150° C. for two hours and baking at 400° C. for four hours. In such a way, a catalyst layer was formed on the honeycomb support, and a catalytic converter of this Example was obtained. A formed amount of the catalyst layer was 50 g per liter of the catalytic converter.

FIG. 7 shows an SEM picture of a vicinity of a corner of the honeycomb support in the catalytic converter of this Example. It is understood that, unlike FIG. 5, a large amount of the catalyst component 11 that looks white enters the insides of the pores 3b in the support. Note that 7% of the total supported amount of the catalyst component was coated on the surface of the support.

(Evaluation Method)

The catalytic converters in which the catalyst layers fabricated in Examples 1 to 12 and Comparative Examples 1 to 4 were formed were partially hollowed. In such a way, test pieces, each of which had a capacity of 0.076 L, were cut out and the test pieces were then evaluated.

(1) Soot Accumulation Test

In a four-cylinder engine with a displacement of 2500 cc, which was made by Nissan Motor Co. Ltd., soot was accumulated on the above-described catalytic converters.

(2) Catalyst Evaluation Test

For each of the catalytic converters on which the soot was accumulated, catalyst performance was evaluated by using a fixed-bed flowing reactor. An oxygen concentration in reaction gas was 5%, and nitrogen was used as balance gas. Conditions were set such that a temperature of gas that entered the catalytic converters was 500° C. and space velocity thereof was 50000 per hour. Under these conditions, the performance of each of the catalytic converters was compared with those of the others based on amounts of CO and $CO_2$ generated for five minutes by oxidation of the soot.

TABLE 1

| | Catalyst | Disappearing material | On-surface supported ratio (%) | Generated amount of CO and $CO_2$ (mmol) |
|---|---|---|---|---|
| Example 1 | $CeO_2$ | activated carbon | 83 | 0.162 |
| Example 2 | Ce—Pr composite oxide | activated carbon | 82 | 0.196 |
| Example 3 | Ce—Y composite oxide | activated carbon | 82 | 0.18 |
| Example 4 | Pt-supported $Al_2O_3$ | activated carbon | 80 | 0.151 |
| Example 5 | $CeO_2$ | activated carbon | 85 | 0.163 |
| Example 6 | Ce—Pr composite oxide | activated carbon | 82 | 0.198 |
| Example 7 | Ce—Y composite oxide | activated carbon | 81 | 0.179 |
| Example 8 | Pt-supported $Al_2O_3$ | activated carbon | 80 | 0.148 |
| Example 9 | $CeO_2$ | polystyrene beads | 61 | 0.16 |
| Example 10 | Ce—Pr composite oxide | polystyrene beads | 59 | 0.19 |
| Example 11 | Ce—Y composite oxide | polystyrene beads | 62 | 0.178 |
| Example 12 | Pt-supported $Al_2O_3$ | polystyrene beads | 62 | 0.147 |
| Comparative Example 1 | $CeO_2$ | none | 35 | 0.098 |
| Comparative Example 2 | Ce—Pr composite oxide | none | 8 | 0.108 |
| Comparative Example 3 | Ce—Y composite oxide | none | 7 | 0.101 |
| Comparative Example 4 | Pt-supported $Al_2O_3$ | none | 7 | 0.095 |

In accordance with Table 1, the generated amounts of CO and $CO_2$ in the catalytic converters obtained in Examples 1 to 12 were larger than in the catalytic converters of Comparative Examples 1 to 4. Specifically, it is understood that the catalyst activity for oxidizing the soot was higher in the catalytic converters of Examples 1 to 12. From this fact, it is obvious that, desirably, such a catalyst component should be supported on the surface of the support.

Note that the catalytic converter according to the present invention can be applied not only to the PM treatment in the diesel engine but also to an air purifying filter and the like.

The entire contents of a Japanese Patent Application No. P2007-29886 with a filing date of Feb. 9, 2007 and a Japanese Patent Application No. P2007-264054 with a filing date of Oct. 10, 2007 are herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A manufacturing method of a catalytic converter, the method comprising:

dispersing, in a solvent, a catalyst component and a disappearing material disappearing by heat, thereby obtaining a slurry;

coating the obtained slurry on a three-dimensional structural support having a plurality of cells partitioned by porous cell walls, in which a pore diameter of the cell walls is 10 μm to 50 μm and porosity of the cell walls is 40 vol % or more; and baking the slurry-coated three-dimensional structural support to eliminate the disappearing material such that a catalyst-coated layer containing the catalyst component is formed on the surfaces of the cell walls of the three-dimensional structural support, and 50 mass % or more of a total supported amount of the catalyst component in the three-dimensional structural support is present on the surfaces of the cell walls.

2. The manufacturing method of the catalytic converter according to claim 1, wherein the disappearing material is at least one selected from the group consisting of activated carbon, polymer resin beads, cellulose, and chaff.

3. The manufacturing method of the catalytic converter according to claim 2, wherein the polymer resin beads are polystyrene beads or polypropylene beads.

\* \* \* \* \*